US006437631B2

(12) United States Patent
Amano

(10) Patent No.: US 6,437,631 B2
(45) Date of Patent: Aug. 20, 2002

(54) ANALOG MULTIPLYING CIRCUIT AND VARIABLE GAIN AMPLIFYING CIRCUIT

(75) Inventor: Yasuhiro Amano, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/867,354

(22) Filed: May 29, 2001

(30) Foreign Application Priority Data

May 30, 2000 (JP) ...................................... 2000-160841

(51) Int. Cl.[7] ................................................ G06F 7/44

(52) U.S. Cl. .................................... 327/359; 455/189.1

(58) Field of Search ........................... 327/52, 53, 355, 327/356, 359, 361, 362; 455/326, 209, 189.1, 71, 323, 190.1

(56) References Cited

U.S. PATENT DOCUMENTS 5,196,742 A 3/1993 McDonald .................. 327/359
5,379,457 A * 1/1995 Nguyen ...................... 455/323
5,515,014 A * 5/1996 Troutman ................... 332/178
5,699,010 A 12/1997 Hatanaka .................... 327/563
6,073,002 A * 6/2000 Peterson ..................... 455/326
6,144,842 A * 11/2000 Birth ........................... 455/71
6,242,964 B1 * 6/2001 Trask ......................... 327/359
6,255,889 B1 * 7/2001 Branson ..................... 327/359
6,300,845 B1 * 10/2001 Zou ........................... 332/178

FOREIGN PATENT DOCUMENTS

JP 2740440 * 1/1998
JP 2861795 * 12/1998
JP 11-251845 * 9/1999

OTHER PUBLICATIONS

Une Fonction (Multiplication Performante) Integree Dans Un Oscilloscope, Baud, Oct./1973, pp. 11–12.*

* cited by examiner

*Primary Examiner*—My-Trang Nuton
(74) *Attorney, Agent, or Firm*—Pearne & Gordon LLP

(57) ABSTRACT

A first analog differential signal V1*p* and a first analog differential signal V1*n* are applied to the respectively commonly-connected bases of two sets of differential pairs which are constructed of transistors Q1 to Q4. A commonly-connected collector of Q1 and Q4 is used as an output terminal Vop, whereas a commonly-connected collector of Q2 and Q3 is used as another output terminal Von. Collectors of Q11 and Q12 are connected to the respective commonly-connected emitters of these differential pairs. Parallel resonant circuits are connected to the respective emitters of Q11 and Q12, and the emitter-to-emitter path is connected by R15. Input circuits 101 and 102 are connected to the respective bases of Q11 and Q12. A second analog differential signal V2*p* and a second analog differential signal V2*n* are inputted to these input circuits 101 and 102. The transistors Q12 and Q14 of the input circuits 101 and 102 constitute current mirror circuits in connection with Q11 and Q13. A total number of longitudinally-stacked stages of the transistors can be made of two stages, and also the analog multiplying circuit can be operated under low power supply voltage.

23 Claims, 5 Drawing Sheets

ANALOG MULTIPLYING CIRCUIT AND VARIABLE GAIN AMPLIFYING CIRCUIT

BACKGROUND OF THE INVENTION

1. Field of the Invention

The present invention generally relates to an analog multiplying circuit and a variable gain amplifying circuit. More specifically, the present invention is directed to an analog multiplying circuit for multiplying two analog signals with each other in a modulating/demodulating circuit of a wireless appliance so as to perform a frequency conversion of the multiplied analog signal, and also to a variable gain amplifying circuit.

2. Description of the Related Art

Very recently, a large number of circuits for processing high frequency (radio frequency) signals are used in wireless appliances, in particular, a great number of such circuits as amplifiers and frequency converters are employed in these wireless appliances. On the other hand, power supply voltages applied in order to operate these circuits are gradually lowered. For instance, in general, the power supply voltage Vcc was selected to be 4.8 V a several years ago. In current wireless appliances, generally speaking, the power supply voltage Vcc is selected to be 2.6 V.

FIG. 9 is a circuit diagram of the conventional dual balanced type analog multiplying circuit (Gilbert cell mixer) constituted by bipolar transistors. In this analog multiplying circuit, first analog differential signals V1*p* and V1*n* are applied to both a common base of transistors Q2 and Q3 and a common base of transistors Q1 and Q4 of two sets of differential pairs Q1–Q2 and Q3–Q4 which employ the transistors Q1 through Q4. A collector of the transistor Q1 is connected to a collector of the transistor Q3 so as to form an output terminal Vop, and a collector of the transistor Q2 is connected to a collector of the transistor Q4 so as to form an output terminal Von. Also, these collectors are connected via load resistors R1 and R2 to a power supply voltage Vcc. To an emitter of the differential pair Q1–Q2 and an emitter of the differential pair Q3–Q4, collectors of transistors Q5 and Q6 are connected, respectively. Second analog differential signals V2*p* and V2*n* are applied to bases of the transistors Q5 and Q6. An emitter of the transistor Q5 and an emitter of the transistor Q6 are connected to a collector of a transistor Q7 and a collector of a transistor Q8, which constitute a current source of a current value Ics, respectively. A feedback resistor Re capable of linearizing a second analog signal input unit is connected between the emitter of the transistor Q5 and the emitter of the transistor Q6. A bias voltage Vb is applied to both a base of a transistor Q7 and a base of a transistor Q8.

Assuming now that a voltage of a base-to-emitter of the transistor Q5 is equal to Vbe5, and a voltage of a base-to-emitter of the transistor Q6 is equal to Vbe6, both an output current I3 of the transistor Q5 and an output current I4 of the transistor Q6, which constitute a first differential amplifier, may be expressed by the following formulae (1) and (2):

$$I3 = Ics + (V2p - V2n - Vbe5 + Vbe6)/Re \quad (1)$$

$$I4 = Ics - (V2p - V2n - Vbe5 + Vbe6)/Re \quad (2)$$

As a result, an output current 2*ΔI=I3–I4 is represented by the following formula (3):

$$\begin{aligned} 2*\Delta I &= I3 - I4 \quad (3)\\ &= 2*(V2p - V2n - Vbe5 + Vbe6)/\mathrm{Re} \\ &= 2*\{V2p - V2n + Vt*\ln(I4/I3)\}/\mathrm{Re} \end{aligned}$$

Note that the voltages between the bases and the emitters of the transistors Q5 and Q6 are assumed as:

$$Vbe5 = Vt*\ln(I3/Is),$$

$$Vbe6 = Vt*\ln(I4/Is)$$

Also, assuming now that a current flowing through the load resistor R1 is I1, a current flowing through the load resistor R2 is I2, and symbol Vt is a thermal voltage, a differential output I1–I2 may be expressed by the below-mentioned formula(4) if the base current is neglected:

$$\begin{aligned} I1 - I2 &= 2*\Delta I*\tanh\{(V1p - V1n)/2Vt \quad (4)\\ &= 2*\{V2p - V2n + Vt*\ln(I4/I3)\}/\\ &\quad \mathrm{Re}*\tanh\{(V1p - V1n)/2Vt\} \end{aligned}$$

Furthermore, when V1*p*–V1*n*<<Vt, the below-mentioned formula can be approximatively satisfied:

$$\tan h\{(V1p - V1n)/2Vt\} = (V1p - V1n)/2Vt.$$

Then, as expressed in the following formula (5), two signals are multiplied with each other:

$$I1 - I2 = 2*\{(V2p - V2n) + Vt*In(I4/I3)\}/Re*\{(V1p - V1n)/2Vt\} \quad (5)$$

In the conventional circuit shown in FIG. 6, a total number of longitudinally-stacked stages of the transistors is selected to be 3 stages. As a consequence, a minimum power supply voltage Vcc(min) required in such a case that silicon bipolar transistors are used must be higher than, or equal to 2.6 V in order that both the voltages between the bases and the emitters of the transistors, and also the amplitude voltages of the input/output signals can be secured, as the power supply voltage Vcc(min).

However, since the conventional analog multiplying circuit cannot be operated under such a power supply voltage lower than, or equal to 2.6 V, this conventional analog multiplying circuit owns the problem that this analog multiplying circuit cannot be used in the presently available wireless appliances having the power supply voltage of 2.6 V.

SUMMARY OF THE INVENTION

The present invention has been made to solve the above-explained problem, and therefore, has an object to provide such an analog multiplying circuit operable in a highly linear mode under low power supply voltage lower than, or equal to 2.6 V.

To solve the above-explained problem, an analog multiplying circuit, according to the present invention, is featured by such an analog multiplying circuit comprising: a first differential pair constructed of a first transistor and a second transistor, the emitters of which are commonly connected to each other; a second differential pair constructed of a third transistor and a fourth transistor, the emitters of which are commonly connected to each other; a first input terminal connected to a commonly-connected base of the second transistor and the third transistor; a second input terminal connected to a commonly-connected base of the first transistor and the fourth transistor; a first output terminal connected to a commonly-connected collector of the first transistor and the third transistor; a second output terminal connected to a commonly-connected collector of the second transistor and the fourth transistor; a first resistor connected between the first output terminal and a power supply; a second resistor connected between the output terminal and the power supply; a fifth transistor, the collector of which is connected to the commonly-connected emitter of the first differential pair; a sixth transistor, the collector of which is connected to the commonly-connected emitter of the second differential pair; a third resistor connected between an emitter of the fifth transistor and the ground; a fourth resistor connected between an emitter of the sixth transistor and the ground; first input means connected to a base of the fifth transistor; and second input means connected to a base of the sixth transistor; wherein: the first input means is arranged by first current generating means, first current mirror means constituted by both the fifth transistor and a seventh transistor, a fifth resistor connected between an emitter of the seventh transistor and the ground, and a third input terminal connected to the emitter of the seventh transistor; and the second input means is arranged by second current generating means, second current mirror means constituted by both the sixth transistor and an eighth transistor, a sixth resistor connected between an emitter of the eighth transistor and the ground; and a fourth input terminal connected to the emitter of the eighth transistor. Since such a circuit arrangement is employed, the analog multiplying circuit can be operated under low power supply voltages.

DESCRIPTION OF THE PREFERRED EMBODIMENTS

Referring now to FIG. 1 to FIG. 8, various embodiment modes of the present invention will be described in detail.

(First Embodiment Mode)

A first embodiment mode of the present invention is an analog multiplying circuit in which while an input circuit arranged by a current mirror circuit is provided in the Gilbert cell type multiplying circuit, a total number of longitudinally-stacked stages of transistors is selected to be 2 stages.

Figure 1:
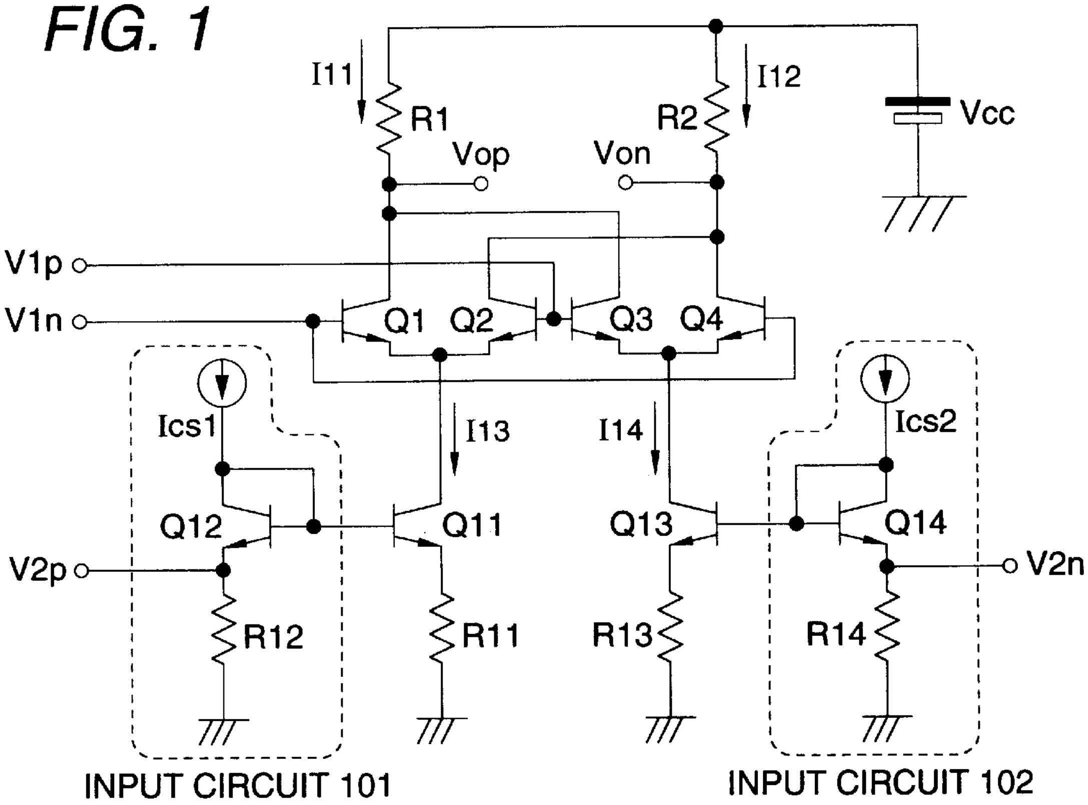
FIG. 1 is a circuit diagram of an analog multiplying circuit according to a first embodiment mode of the present invention.

FIG. 1 is a circuit diagram for representing an arrangement of an analog multiplying circuit according to a first embodiment mode of the present invention. It should be noted that the same reference numerals used in the prior art will be employed as those for denoting the same operations/functions of this analog multiplying circuit. In FIG. 1, a first analog differential signal V1*p* and a first analog differential signal V1*n* are applied to bases of two sets of differential pairs Q1–Q2 and Q3–Q4 arranged by employing transistors Q1 to Q4. A collector of the transistor Q1 is connected to a collector of the transistor Q3 so as to form an output terminal Vop, and a collector of the transistor Q2 is connected to a collector of the transistor Q4 so as to form an output terminal Von. Also, these collectors are connected via load resistors R1 and R2 to a power supply voltage Vcc. To an emitter of the differential pair Q1–Q2 and an emitter of the differential pair Q3–Q4, collectors of transistors Q5 and Q6 are connected, respectively.

Emitters of the transistors Q11 and Q12 are connected via a resistor R11 and another resistor R13 to the ground, respectively. Bases of the transistors Q11 and Q12 are connected to an input circuit 101 and another input circuit 102, respectively. The input circuit 101 and the input circuit 102 are arranged by current sources Ics1 and Ics2; transistors Q12 and Q14; and resistors R12 and R14. It is so assumed that a current of the current source Ics1, or the current source Ics2 is selected to be "Ics." Both emitters of the transistors Q12 and Q14 form an input terminal V1*p* and another input terminal V1*n,* and are connected via a resistor R12 and another resistor R14 to the ground. Also, both the transistor Q12 and the transistor Q11 constitute a current mirror circuit, and both the transistor Q13 and the transistor Q14 constitute a current mirror circuit. These transistors Q12/Q11/Q13/Q14 own such a function that biases of both the transistor Q11 and the transistor Q13 are set so as to transfer input signals.

Referring now to FIG. 1, operations of the analog multiplying circuit with employment of the above-described circuit arrangement, according to the first embodiment mode of the present invention, will be described. A first description will now be made of operations of both the input circuit 101 and the input circuit 102. The input circuit 101 and the input circuit 102 are constituted by the current mirror circuit made of both the transistor Q11 and the transistor Q12, and also by the current mirror circuit made of both the transistor Q13 and the transistor Q14. These current mirror circuits sets bias currents of the transistors Q11 and Q13.

In the case that no input signal is supplied to the input terminals V1*p*and V1*n,* assuming now that current amplifications "hfe" of transistors are very large, a relationship among the current Ics flowing through the transistors Q11 and Q13, a bias current I13 of the transistor Q11, and a bias current I14 of the transistor Q14 may be expressed by the following formulae (6) and (7):

$$Ics*R12+Vt*\ln(Ics/Is)=I13*R11+Vt*\ln(I13/Is) \quad (6)$$

$$Ics*R14+Vt*\ln(Ics/Is)=I14*R13+Vt*\ln(I14/Is) \quad (7)$$

Also, when a signal is entered to both the input terminal V1*p* and the input terminal V1*n,* since collector currents flowing through the transistors Q12 and Q14 are determined by the current source Ics, both the transistor Q12 and the transistor Q14 may function as buffers. At this time, an input impedance of the input terminal V2p becomes a parallel impedance between a dynamic resistor re12 of the transistor Q12 and the resistor R12, and an input impedance of the input terminal V2n becomes a parallel impedance between a dynamic resistor re14 of the transistor Q14 and the resistor R14. As a consequence, the bias currents of the transistor Q11 and the transistor Q13 may be set by this input circuit. Furthermore, both the input impedance of the input terminal V2p and the input impedance of the input terminal V2n may be determined by this input circuit.

Next, both an output current I13 of the transistor Q11 and an output current I14 of the transistor Q13 are calculated which constitute a differential amplifier connected to both the input circuit 101 and the input circuit 102. Assuming now that a base-to-emitter voltage of the transistor Q11 is Vbe11 and a base-to-emitter voltage of the transistor Q13 is Vbe13, both an output current I13 of the transistor Q11 and an output current I14 of the transistor Q13, which constitute another differential amplifier, may be expressed by the following formulae (8) and (9):

$$I13=\{V2p+Vt*\ln(Ics/I13)\}/R11 \quad (8)$$

$$I14=\{V2n+Vt*\ln(Ics/I14)\}/R13 \quad (9)$$

As a consequence, in such a case that the resistance values are set to R11=R13, an output current 2*ΔI=I13−I14 of the first differential amplifier may be expressed by the following formula (10):

$$\begin{aligned} 2*\Delta I &= I13-I14 \quad (10)\\ &= \{(V2p-V2n)+Vt*\ln(I14/I13)\}/R11 \end{aligned}$$

Similar to the prior art, this differential current is entered into the differential circuits made of the transistors Q1–Q2 and of the transistors Q3–Q4. As a consequence, while the base currents are neglected, a differential current "I11−I12" outputted from the load resistors R1 and R2 may be expressed by the below-mentioned formula (11):

$$\begin{aligned} I11-I12 &= 2*\Delta I*\tanh\{(V1p-V1n)/2Vt\} \quad (11)\\ &= \{(V2p-V2n)+Vt*\ln(I14/I13)\}/\\ &\quad R11*\tanh\{(V1p-V1n)/2Vt\} \end{aligned}$$

Furthermore, when V1p−V1n<<Vt, the following equation may be satisfied:

$$\tan h\{(V1p-V1n)/2Vt\}=(V1p-V1n)/2Vt$$

Then, a multiplication is carried out between two signals, as indicated in the following formula (12):

$$I11-I12=\{(V2p-V2n)+Vt*\ln(I14/I13)\}/R11*\{(V1p-V1n)/2Vt\} \quad (12)$$

As previously described, a multiplied output between the two analog signals may be obtained. Since a total number of longitudinally-stacked stages of the transistors are two stages, in the case that silicon bipolar transistors are used, even when base-to-emitter voltages of the silicon bipolar transistors and amplitude voltage portions of input/output signals are secured, this analog multiplying circuit can be operated under the power supply voltage Vcc=2.0 V.

Also, in order to suppress the adverse influence caused by the non-linear characteristics of both the transistor Q11 and the transistor Q13, even in such a case that the collector currents of both the transistors Q11 and Q13 are increased, the collector currents may be arbitrarily set based upon the current sources Ics1, Ics2 of the input circuits 101, 102, and the resistors R12 and R14.

It should be understood that the current consumption of the analog multiplying circuit according to this embodiment mode is merely increased by the currents of both the current sources Ics1 and Ics2, as compared with that of the prior art. Since the current values of the current sources may be freely set by changing the resistors R12 and R14, the increases of the current consumption can be suppressed.

Figure 2:
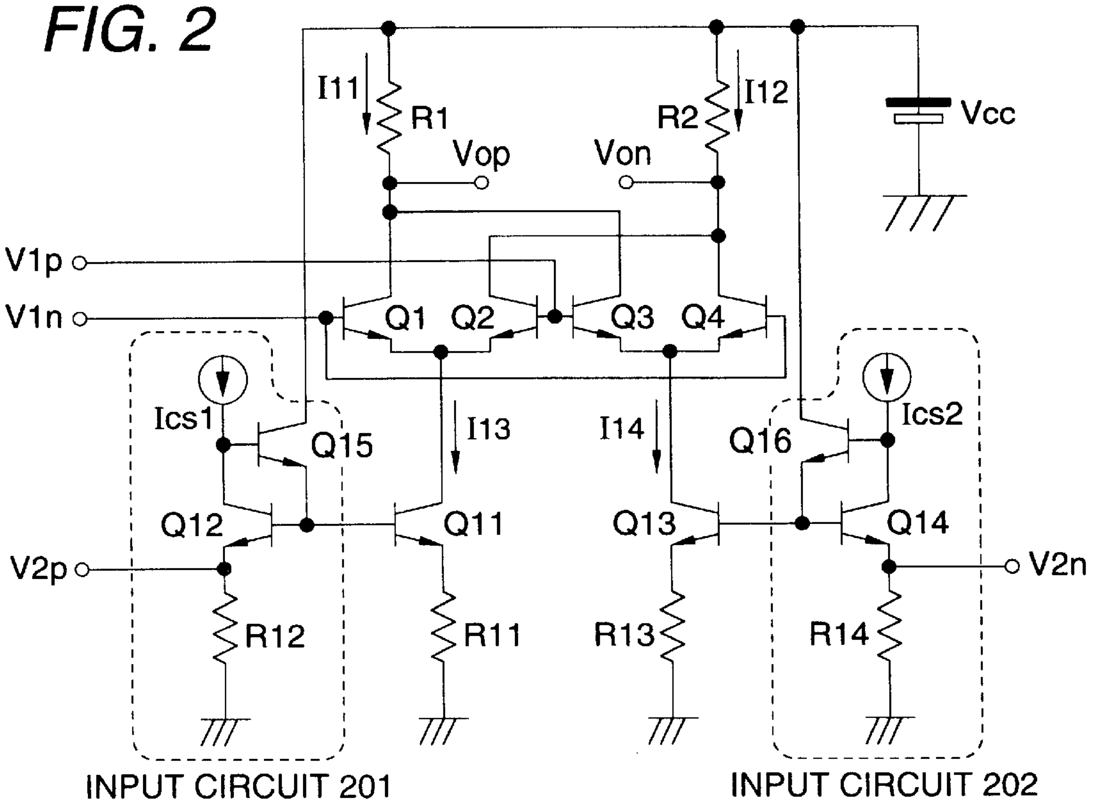
FIG. 2 is a circuit diagram of a variable gain amplifying circuit according to the first embodiment mode of the present invention.

Also, as shown in FIG. 2, while both the collector of the transistor Q2 and the collector of the transistor Q3 are connected to the power supply voltages, since the gain is controlled based upon a voltage difference between the input signal V1p and the input signal V1n, such a variable gain amplifying circuit may be arranged by which both the input signal V2p and the input signal V2n can be amplified by a desirable gain. Also, in this case, a similar effect achieved by the above-described analog multiplying circuit may be achieved by this variable gain amplifying circuit.

As previously explained, in accordance with the first embodiment mode of the present invention, while the input circuits constituted by the current mirror circuits are employed in the Gilbert cell type analog multiplying circuit, the longitudinally-stacked stages of the transistors are realized by two stages. As a consequence, the minimum power supply voltage can be selected to be 2.0 V.

(Second Embodiment Mode)

A second embodiment mode of the present invention corresponds to such an analog multiplying circuit featured by that a base current compensating circuit is provided in an input circuit made of a current mirror circuit arrangement as to a Gilbert cell type analog multiplying circuit in which a longitudinally-stacked stage of transistors is selected to be 2 stages.

Figure 3:
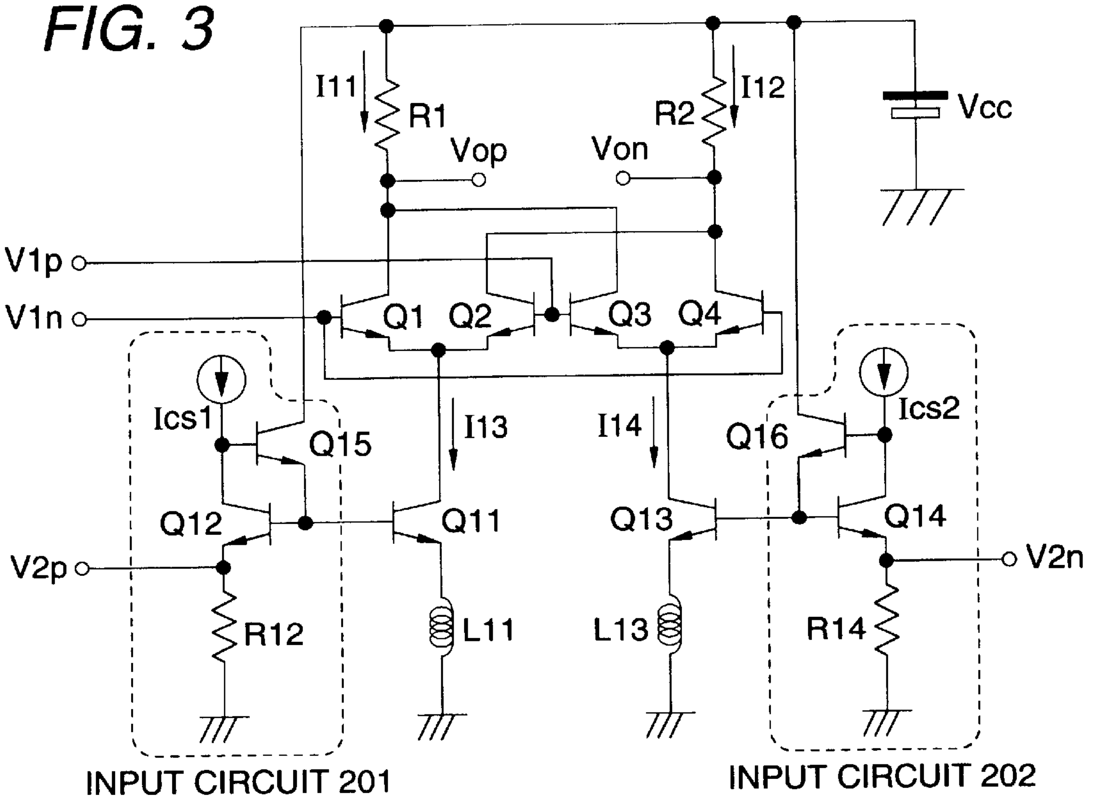
FIG. 3 is a circuit diagram of an analog multiplying circuit according to a second embodiment mode of the present invention.

FIG. 3 is a circuit diagram for representing an arrangement of an analog multiplying circuit according to a second embodiment mode of the present invention. It should be noted that the same reference numerals shown in the conventional analog multiplying circuit will be employed as those for indicating the same operations/functions in the second analog multiplying circuit. In FIG. 3, a different structural point with respect to the first embodiment mode shown in FIG. 1 is given as follows: Both a transistor Q15 and a transistor Q16 are additionally employed in order to compensate for base currents flowing through the current mirror circuits of the input circuit 101 and the input circuit 102. These current mirror circuits are arranged by the transistors Q12 and Q11, and the transistors Q13 and Q14.

Referring now to FIG. 3, operations of the analog multiplying circuit with employment of the above-explained arrangement, according to the second embodiment mode of the present invention, will now be explained. In the first embodiment mode, the distortion characteristic in the multiplying circuit is largely and adversely influenced by the non-linear characteristic of the transistors Q11 and Q13. To suppress this adverse influence, both the collector current of the transistor Q11 and the collector of the transistor Q12 are required to be increased. In this case, an adverse influence of base currents of transistors cannot be neglected in the current mirror circuits of the input circuits 101 and 102, which are constituted by the transistors Q11/Q12 and the transistors Q13/Q14.

In the second embodiment mode of the present invention, the transistors Q15 and Q16 used to compensating for the base currents are inserted in order to reduce the adverse influence of the base currents of the current mirror circuits employed in the input circuits 101 and 102 of the first embodiment mode. As a consequence, the operations of the second embodiment mode are similar to those of the first embodiment mode, so that a similar function can be owned.

Similar to the second embodiment mode, as explained above, while the minimum power supply voltage Vcc(min) is selected to be 2.0 V, the multiplied output of the two analog signals can be obtained. Furthermore, in order to suppress the adverse influence of the non-linear characteristics of the transistors Q11 and Q13, even in such a case that the collector current of the transistor Q11 and the collector current of the transistor Q13 are increased, the adverse influence caused by the base currents of the current mirror circuits can be reduced, and the distortion characteristic of the analog multiplying circuit can be improved.

Figure 4:
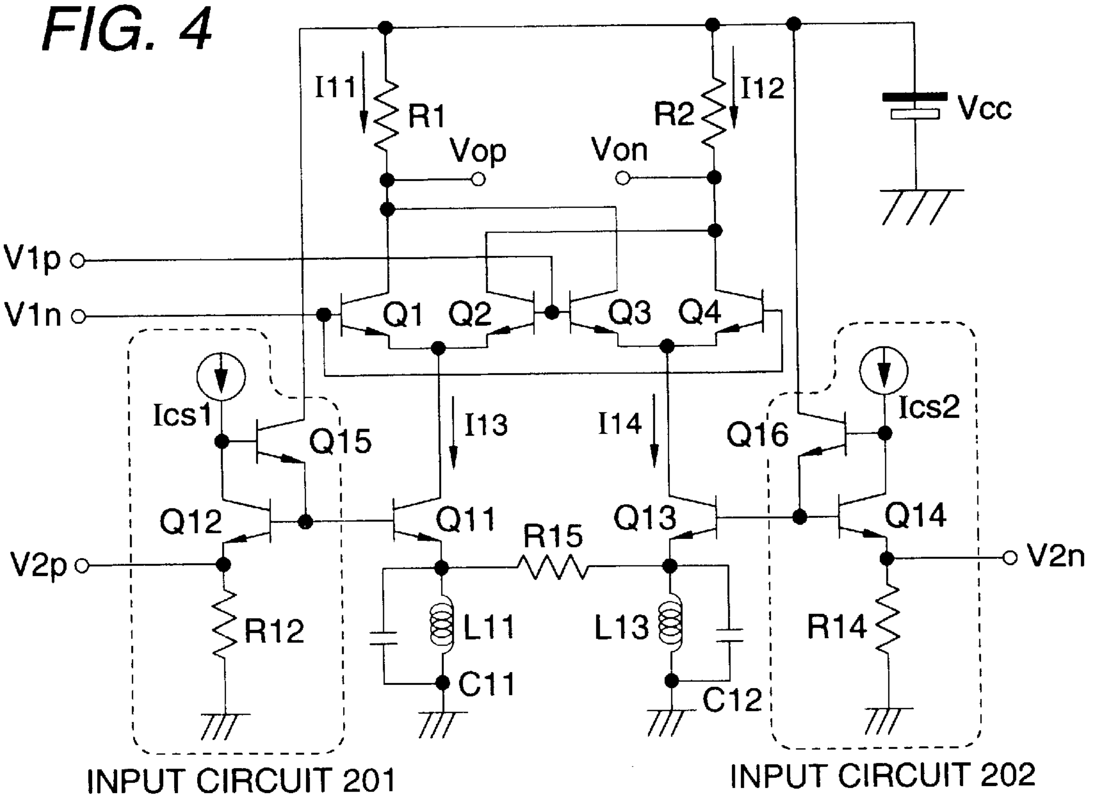
FIG. 4 is a circuit diagram of a variable gain amplifying circuit according to the second embodiment mode of the present invention.

Also, as shown in FIG. 4, while both the collector of the transistor Q2 and the collector of the transistor Q3 are connected to the power supply voltages, since the gain is controlled based upon a voltage difference between the input signal V1*p* and the input signal V1*n*, such a variable gain amplifying circuit may be arranged by which both the input signal V2*p* and the input signal V2*n* can be amplified by a desirable gain. Also, in this case, a similar effect achieved by the above-described analog multiplying circuit may be achieved by this variable gain amplifying circuit.

As previously described, in accordance with the second embodiment mode of the present invention, since the analog multiplying circuit is arranged in such a manner that the base current compensating circuit is employed in the input circuit made of the current mirror circuit arrangement with respect to the Gilbert cell type analog multiplying circuit in which the longitudinally-stacked stage of the transistors is made by the two stages, the distortion characteristic can be improved while suppressing the adverse influences of the non-linear characteristic. While the minimum power supply voltage Vcc(min) is selected to be 2.0 V, the multiplied output between the two analog signals can be obtained.

(Third Embodiment Mode)

An analog multiplying circuit, according to a third embodiment mode of the present invention, is such a Gilbert cell type analog multiplying circuit featured by that a longitudinally-stacked stage of transistors is selected to be 2 stages, and an emitter resistor of a differential amplifying circuit is constituted by an inductance.

Figure 5:
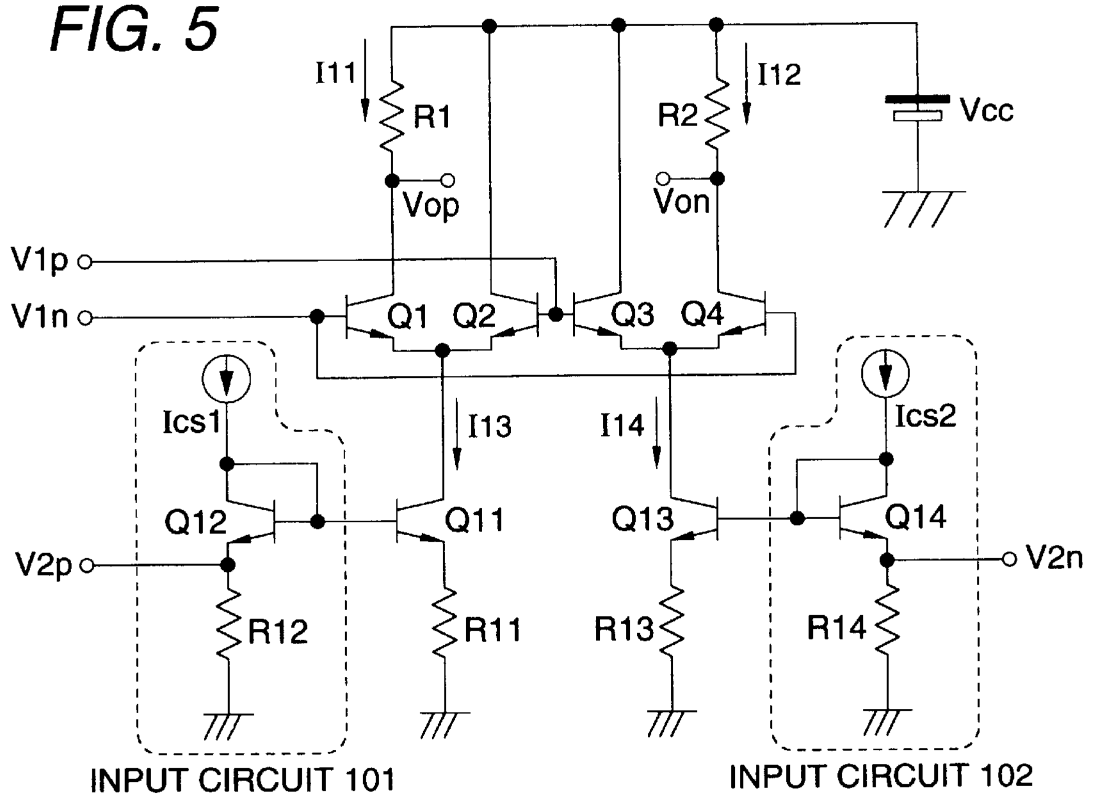
FIG. 5 is a circuit diagram of an analog multiplying circuit according to a third embodiment mode of the present invention.

FIG. 5 is a circuit diagram for representing an arrangement of an analog multiplying circuit according to a third embodiment mode of the present invention. It should be noted that the same reference numerals shown in the conventional analog multiplying circuit will be employed as those for indicating the same operations/functions in the second analog multiplying circuit. In FIG. 5, a different structural point with respect to the second embodiment mode shown in FIG. 3 is given as follows. That is, the resistor R11 and the resistor R13, which are connected to the emitter of the transistor Q11 and the emitter of the transistor Q13, are replaced by an inductor L11 and another inductor L13, respectively.

Referring now to FIG. 5, operations of the analog multiplying circuit with employment of the above-explained arrangement, according to the third embodiment mode of the present invention, will now be explained. Both an input circuit 201 and an input circuit 202 are arranged in a similar manner to those of the second embodiment mode, and own similar functions and also similar performance. Output currents I13 and I14 of the transistors Q11 and Q13 which constitute the differential amplifiers in a high frequency range may be expressed based upon the following formulae (13) and (14), assuming and that an impedance of the inductor L11 is "Z11", and an impedance of the inductor L13 is "Z13."

$$I13=\{V2p+Vt*\ln(Ics/I13)\}/Z11 \quad (13)$$

$$I14=\{V2n+Vt*\ln(Ics/I14)\}/Z13 \quad (14)$$

As a consequence, in such a case that the impedance is selected to be Z11=Z13, an output current 2*ΔI=I13−I14 of the first differential amplifier may be represented by the formula (15):

$$\begin{aligned} 2*\Delta I &= I13-I14 \quad (15)\\ &= \{(V2p-V2n)+Vt*\ln(I14/I13)\}/Z11 \end{aligned}$$

Similar to the prior art, this differential current is entered into the differential circuits made of the transistors Q1–Q2 and of the transistors Q3–Q4. As a consequence, while the base currents are neglected, a differential current "I11–I12" outputted from the load resistors R1 and R2 may be expressed by the below-mentioned formula (16):

$$\begin{aligned} I11-I12 &= 2*\Delta I*\tanh\{(V1p-V1n)/2Vt\} \quad (16)\\ &\{(V2p-V2n)+Vt*\ln(I14/I13)\}/\\ &Z11*\tanh\{(V1p-V1n)/2Vt\} \end{aligned}$$

Furthermore, when V1*p*–V1*n*<<Vt, the following equation may be satisfied:

$$\tan h\{(V1p-V1n)/2Vt\}=(V1p-V1n)/2Vt$$

Then, a multiplication is carried out between two signals, as indicated in the following formula (17):

$$I11-I12=\{(V2p-V2n)+Vt*\ln(I14/I13)\}/Z11*\{(V1p-V1n)/2Vt\} \quad (17)$$

As explained above, while a DC voltage drop by the inductor L11 and L13 is eliminated, and the power supply voltage is further lowered, the multiplied output between the two analog signals can be obtained.

Figure 6:
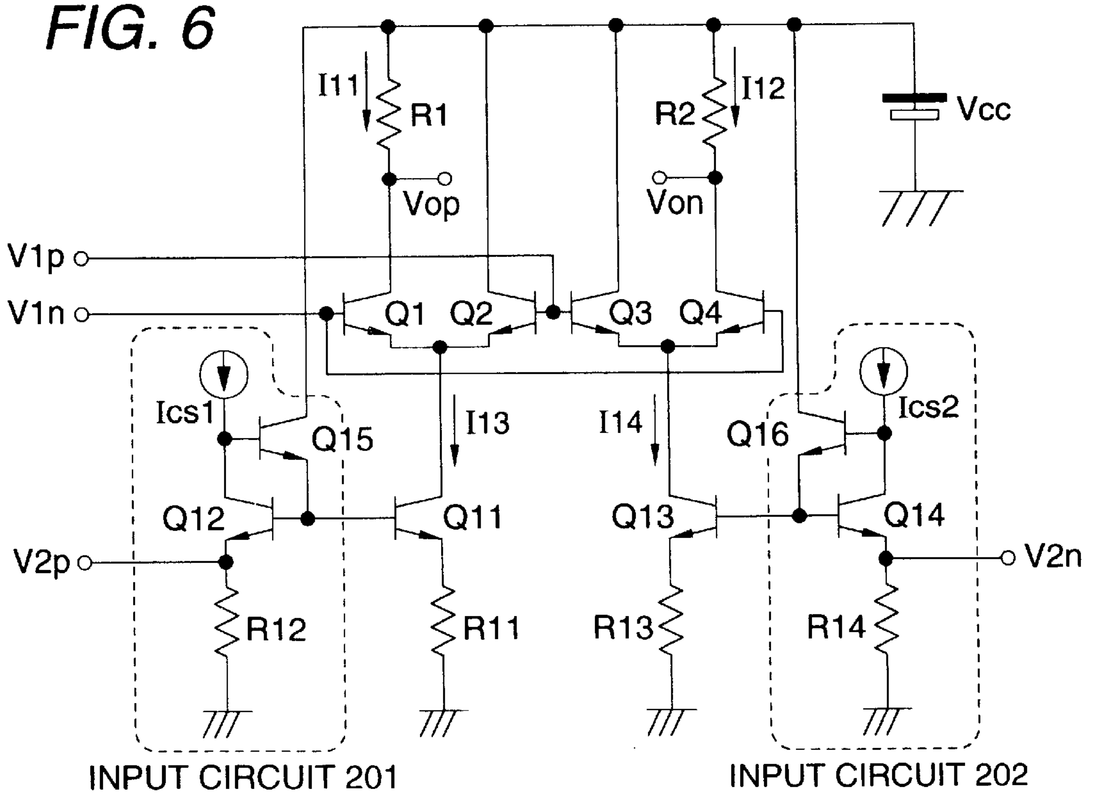
FIG. 6 is a circuit diagram of a variable gain amplifying circuit according to the third embodiment mode of the present invention.

Also, as shown in FIG. 6, while both the collector of the transistor Q2 and the collector of the transistor Q3 are connected to the power supply voltages, since the gain is controlled based upon a voltage difference between the input signal V1*p* and the input signal V1*n*, such a variable gain amplifying circuit may be arranged by which both the input signal V2*p* and the input signal V2*n* can be amplified by a desirable gain. Also, in this case, a similar effect achieved by the above-described analog multiplying circuit may be achieved by this variable gain amplifying circuit.

As previously described, in accordance with the third embodiment mode of the present invention, since the analog multiplying circuit is arranged in such a manner that the emitter resistance of the differential amplifying circuit is replaced by the inductance with respect to the Gilbert cell type analog multiplying circuit in which the longitudinally-stacked stage of the transistors is made by the two stages, while the minimum power supply voltage Vcc(min) is lowered rather than 2.0 V, the multiplied output between the two analog signals can be obtained.

(Fourth Embodiment Mode)

An analog multiplying circuit, according to a fourth embodiment mode of the present invention, is such a Gilbert cell type analog multiplying circuit featured by that a longitudinally-stacked stage of transistors is selected to be 2 stages, and a parallel resonant circuit is connected to an emitter of a transistor which constitutes a differential amplifying circuit.

Figure 7:
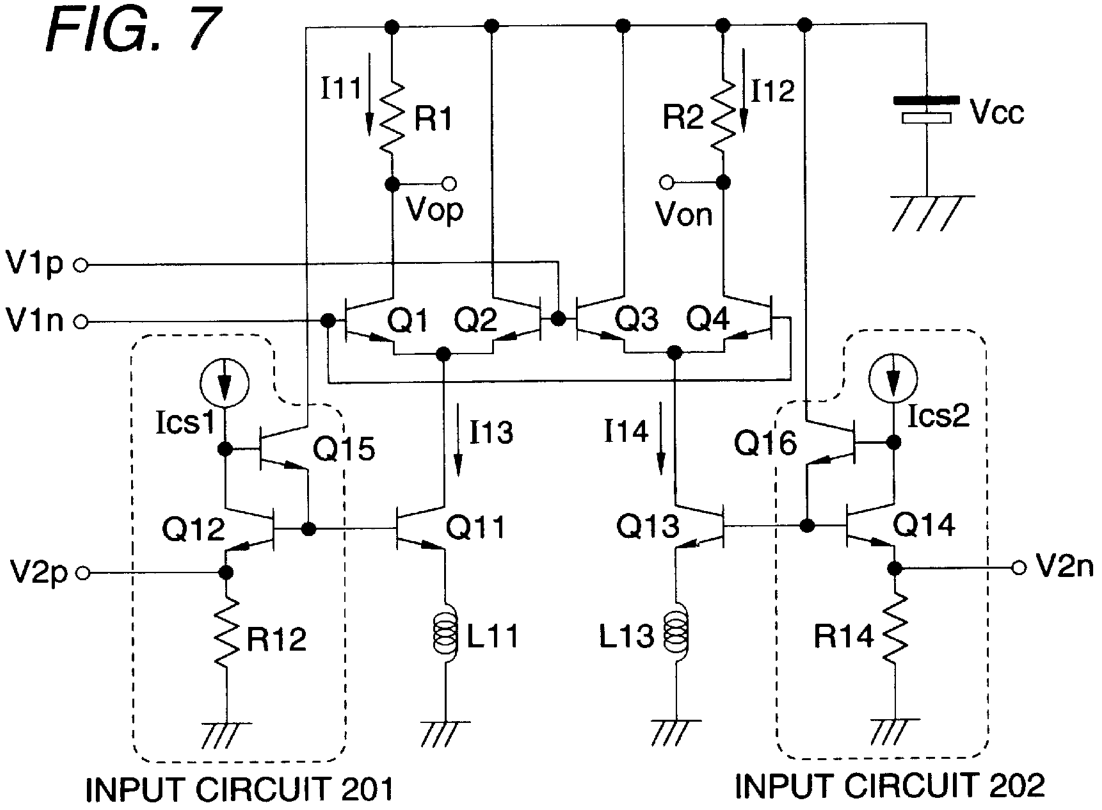
FIG. 7 is a circuit diagram of an analog multiplying circuit according to a fourth embodiment mode of the present invention.

FIG. 7 is a circuit diagram for representing an arrangement of an analog multiplying circuit according to a fourth embodiment mode of the present invention. It should be noted that the same reference numerals shown in the conventional analog multiplying circuit will be employed as those for indicating the same operations/functions in the fourth analog multiplying circuit. In FIG. 7, the analog multiplying circuit of this fourth embodiment mode owns a different technical point, as compared with that of the third embodiment mode shown in FIG. 5. That is, both a capacitor C11 and another capacitor C12 are connected parallel to both an inductor L11 and another inductor L13, which are connected to the respective emitters of transistors Q11 and Q13, constituting a differential amplifying circuit. Also, a resistor R15 is inserted between the emitter of the transistor Q11 and the emitter of the transistor Q13.

Referring now to FIG. 7, operations of the analog multiplying circuit with employment of the above-explained arrangement, according to the fourth embodiment mode of the present invention, will now be explained. Both an input circuit 201 and an input circuit 202 are arranged in a similar manner to those of the third embodiment mode, and own similar functions and also similar performance. Since a parallel resonant circuit constituted by the inductors L11/L13 and the capacitors C11/C12 is employed, an impedance may be made of an infinite value at a desirable frequency, whereas the impedance may become substantially zero at any frequencies other then this desirable frequency. These inductors L11/L13 and capacitors C11/C12 are connected to the emitters of the transistors Q11 and Q13, which constitute the differential amplifiers connected to both the input circuit 201 and the input circuit 202. As a result, bias currents of the analog multiplying circuit according to this fourth embodiment mode may be set in a similar manner to that of the third embodiment mode. Also, since the impedance may become the infinite value at such a desirable frequency, an output current of the differential amplifying circuit may be determined based upon the resistor R15 connected between the emitters of the transistors Q11 and Q13 in a similar manner to the prior art. At this time, the output current is represented by the below-mentioned formula $$\begin{aligned} 2*\Delta I &= I13 - I14 \\ &= 2*\{V2p - V2n + Vt*\ln(I14/I13)\}/R15 \end{aligned} \tag{18}$$

This formula (18) is established by merely replacing the resistor Re by the resistor R15 in the output current of the differential amplifying circuit employed in the conventional analog multiplying circuit.

Also, similar to the conventional analog multiplying circuit, assuming now that a current flowing through the load resistor R1 is "I11", a current flowing through the load resistor R2 is "I12", and symbol "Vt" indicates a thermal voltage, a differential output current "I11–I12" may be expressed by the following formula (19), while the base currents are neglected:

$$I11-I12=2*\{(V2p-V2n)+Vt*\ln(I14/I13)\}/R15*\{(V1p-V1n)/2Vt\} \tag{19}$$

As previously described, the multiplied output between the two analog signals can be obtained. In accordance with the analog multiplying circuit of the fourth embodiment mode, the impedances connected to the emitters of the transistors Q11 and Q13 can be neglected, as compared with the third embodiment mode. Also, since the differential output circuit of the transistors Q11 and Q13 is determined based upon the resistor R15, the linear characteristics (linearity) of the transistors Q11 and Q13 can be improved.

Figure 8:
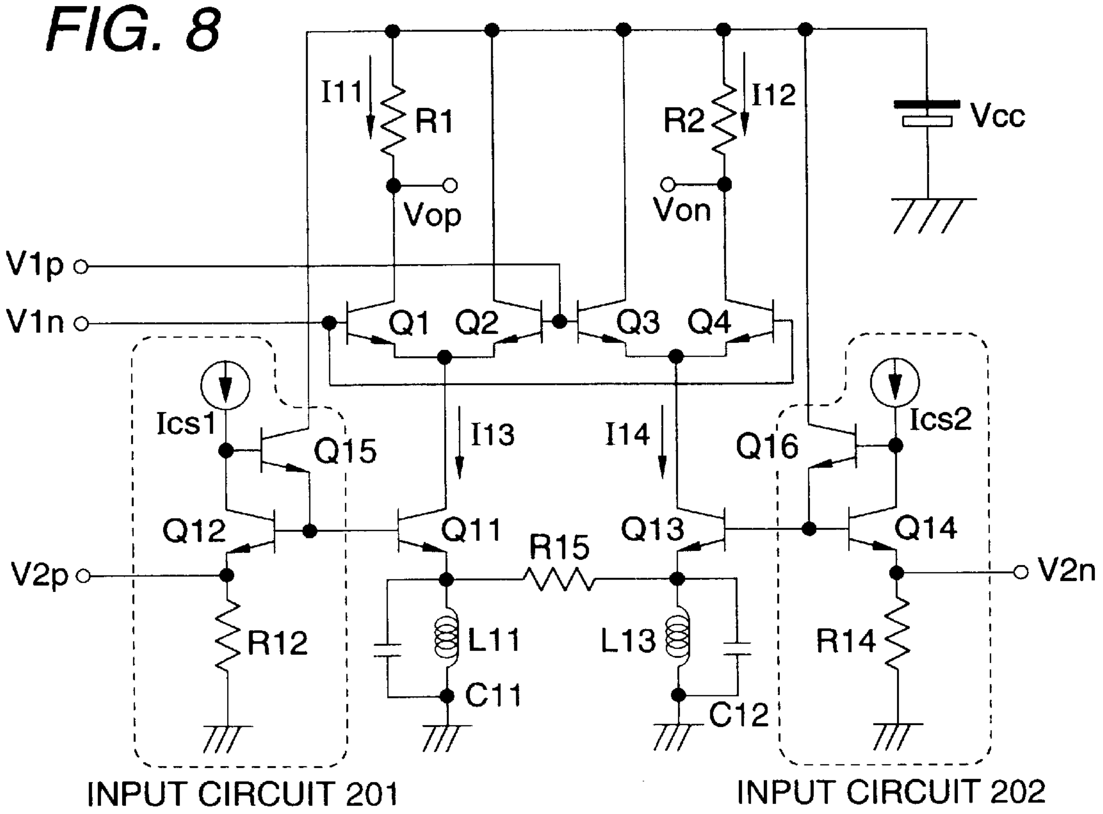
FIG. 8 is a circuit diagram of a variable gain amplifying circuit according to the fourth embodiment mode of the present invention.
Figure 9:
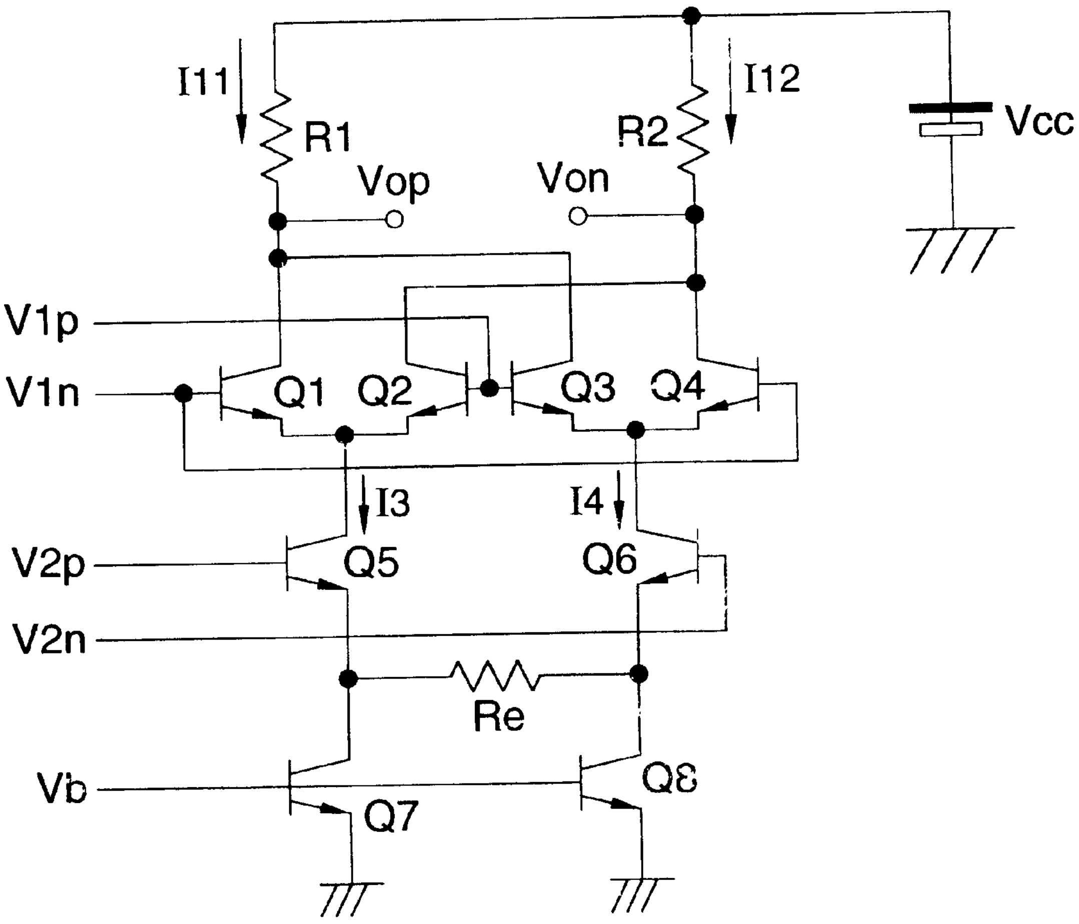
FIG. 9 PRIOR ART
FIG. 9 is a circuit diagram of the conventional analog multiplying circuit.

Also, as shown in FIG. 8, while both the collector of the transistor Q2 and the collector of the transistor Q3 are connected to the power supply voltages, since the gain is controlled based upon a voltage difference between the input signal V1*p* and the input signal V1*n*, such a variable gain amplifying circuit may be arranged by which both the input signal V2*p* and the input signal V2*n* can be amplified by a desirable gain. Also, in this case, a similar effect achieved by the above-described analog multiplying circuit may be achieved by this variable gain amplifying circuit.

As previously explained, in accordance with the fourth embodiment mode of the present invention, in the Gilbert cell type analog multiplying circuit in which the longitudinally-stacked stages of the transistors are realized by two stages, the parallel resonant circuits are connected to the emitters of the transistors which constitute the differential amplifying circuits. As a result, the linearity can be improved.

Also, it should be noted that the bipolar transistors are employed in the embodiment modes of the present invention. Alternatively, if elements owns a similar function to that of such a bipolar transistor, then any other electronic devices such as FET and MOS transistor may be employed. Also, the circuit arrangements of the input circuits 101, 102, 201, and 202 are merely exemplified. If any other circuits have a similar function, then these circuits may be equivalently used. Alternatively, while the analog multiplying circuits and the variable gain amplifying circuits according to the embodiment modes of the present invention are employed, a frequency converting apparatus, a communication terminal apparatus, and a base station apparatus may be arranged. Also, such a communication system with employment of a communication terminal apparatus and a base station apparatus may be constituted by employing the above-described analog multiplying circuits and variable gain amplifying circuit. Furthermore, since the analog multiplying circuits and the variable gain amplifying circuits can be operated under low power supply voltages, the resulting power consumption can be reduced.

As apparent from the foregoing descriptions, the analog multiplying circuit of the present invention is arranged by such an analog multiplying circuit comprising: a first differential pair constructed of a first transistor and a second transistor, the emitters of which are commonly connected to each other; a second differential pair constructed of a third transistor and a fourth transistor, the emitters of which are commonly connected to each other; a first input terminal connected to a commonly-connected base of the second transistor and the third transistor; a second input terminal connected to a commonly-connected base of the first transistor and the fourth transistor; a first output terminal connected to a commonly-connected collector of the first transistor and the third transistor; a second output terminal connected to a commonly-connected collector of the second transistor and the fourth transistor; a first resistor connected between the first output terminal and a power supply; a second resistor connected between the output terminal and the power supply; a fifth transistor, the collector of which is connected to the commonly-connected emitter of the first differential pair; a sixth transistor, the collector of which is connected to the commonly-connected emitter of the second differential pair; a third resistor connected between an emitter of the fifth transistor and the ground; a fourth resistor connected between an emitter of the sixth transistor and the ground; first input means connected to a base of the fifth transistor; and second input means connected to a base of the sixth transistor; wherein: the first input means is arranged by first current generating means, first current mirror means constituted by both the fifth transistor and a seventh transistor, a fifth resistor connected between an emitter of the seventh transistor and the ground, and a third input terminal connected to the emitter of the seventh transistor; and the second input means is arranged by second current generating means, second current mirror means constituted by both the sixth transistor and an eighth transistor, a sixth resistor connected between an emitter of the eighth transistor and the ground; and a fourth input terminal connected to the emitter of the eighth transistor. Since such a circuit arrangement is employed, the analog multiplying circuit can be operated under low power supply voltages. As a consequence, a total number of longitudinally-stacked stages of the transistors can be made of two stages. The following effects can be achieved. That is, even when both the base-to-emitter voltages of the transistors and the amplitude voltage portions of the input/output signals are secured, the minimum power supply voltage Vcc(min) in the case that the silicon bipolar transistors are used can be selected to be 2.0 V. Thus, the analog multiplying circuit can be operated under low power supply voltage.

Since the analog multiplying circuit is arranged by that a ninth transistor for compensating a base current is employed in the first current mirror means; and a tenth transistor for compensating a base current is employed in the second current mirror means, the following effects can be achieved. That is, even in such a case that the collector current of the transistor is increased in order to suppress the distortion characteristic of the multiplying circuit, the adverse influences caused by the base current of the current mirror circuit can be reduced.

Also, since the analog multiplying circuit is arranged by that the third resistor is replaced by a first inductor; and the fourth resistor is replaced by a second inductor, there is such an effect that the DC voltage drop caused by the resistor can be eliminated, and furthermore, the power supply voltage can be lowered.

Also, since the analog multiplying circuit is arranged by further comprised of: a second resistor connected between the emitter of the fifth transistor and the emitter of the sixth transistor; a first capacitor connected parallel to the first inductor; and a second capacitor connected parallel to the second inductor, there is such an effect that the linearly of this analog multiplying circuit can be improved.

What is claimed is:

1. An analog multiplying circuit comprising:

a first differential pair constructed of a first transistor and a second transistor, the emitters of which are commonly connected to each other;

a second differential pair constructed of a third transistor and a fourth transistor, the emitters of which are commonly connected to each other;

a first input terminal connected to a commonly-connected base of said second transistor and said third transistor;

a second input terminal connected to a commonly-connected base of said first transistor and said fourth transistor;

a first output terminal connected to a commonly-connected collector of said first transistor and said third transistor;

a second output terminal connected to a commonly-connected collector of said second transistor and said fourth transistor;

a first resistor connected between said first output terminal and a power supply;

a second resistor connected between said second output terminal and said power supply;

a fifth transistor, the collector of which is connected to the commonly-connected emitter of said first differential pair;

a sixth transistor, the collector of which is connected to the commonly-connected emitter of said second differential pair;

a third resistor connected between an emitter of said fifth transistor and the ground;

a fourth resistor connected between an emitter of said sixth transistor and the ground;

first input means connected to a base of said fifth transistor; and second input means connected to a base of said sixth transistor; wherein:

said first input means is arranged by first current generating means, first current mirror means constituted by both said fifth transistor and a seventh transistor, a fifth resistor connected between an emitter of said seventh transistor and the ground, and a third input terminal connected to the emitter of said seventh transistor; and said second input means is arranged by second current generating means, second current mirror means constituted by both said sixth transistor and an eighth transistor, a sixth resistor connected between an emitter of said eighth transistor and the ground; and a fourth input terminal connected to the emitter of said eighth transistor.

2. An analog multiplying circuit as claimed in claim 1 wherein:

a ninth transistor for compensating a base current is employed in said first current mirror means; and a tenth transistor for compensating a base current is employed in said second current mirror means.

3. An analog multiplying circuit as claimed in claim 2 wherein:

said third resistor is replaced by a first inductor; and said fourth resistor is replaced by a second inductor.

4. An analog multiplying circuit as claimed in claim 3 wherein:

said analog multiplying circuit is further comprised of:

a seventh resistor connected between the emitter of said fifth transistor and the emitter of said sixth transistor;

a first capacitor connected parallel to said first inductor; and a second capacitor connected parallel to said second inductor.

5. A variable gain amplifying circuit comprising:

a first differential pair constructed of a first transistor and a second transistor, the emitters of which are commonly connected to each other;

a second differential pair constructed of a third transistor and a fourth transistor, the emitters of which are commonly connected to each other;

a first input terminal connected to a commonly-connected base of said second transistor and said third transistor;

a second input terminal connected to a commonly-connected base of said first transistor and said fourth transistor;

a first output terminal connected to a collector of said first transistor;

a second output terminal connected to a collector of said fourth transistor;

a first resistor connected between said first output terminal and a power supply;

a second resistor connected between said second output terminal and said power supply;

variable gain control means constituted by said second transistor, and means for connecting the collector of said third transistor to the power supply;

a fifth transistor, the collector of which is connected to the commonly-connected emitter of said first differential pair;

a sixth transistor, the collector of which is connected to the commonly-connected emitter of said second differential pair;

a third resistor connected between an emitter of said fifth transistor and the ground;

a fourth resistor connected between an emitter of said sixth transistor and the ground;

first input means connected to a base of said fifth transistor; and second input means connected to a base of said sixth transistor; wherein:

said first input means is arranged by first current generating means, first current mirror means constituted by both said fifth transistor and a seventh transistor, a fifth resistor connected between an emitter of said seventh transistor and the ground, and a third input terminal connected to the emitter of said seventh transistor; and said second input means is arranged by second current generating means, second current mirror means constituted by both said sixth transistor and an eighth transistor, a sixth resistor connected between an emitter of said eighth transistor and the ground; and a fourth input terminal connected to the emitter of said eighth transistor.

6. A variable gain amplifying circuit as claimed in claim 5 wherein:

a ninth transistor for compensating a base current is employed in said first current mirror means; and a tenth transistor for compensating a base current is employed in said second current mirror means.

7. A variable gain amplifying circuit as claimed in claim 6 wherein:

said third resistor is replaced by a first inductor; and said fourth resistor is replaced by a second inductor.

8. A variable gain amplifying circuit as claimed in claim 7 wherein:

and variable gain amplifying circuit is further comprised of:

a seventh resistor connected between the emitter of said fifth transistor and the emitter of said sixth transistor;

a first capacitor connected parallel to said first inductor; and a second capacitor connected parallel to said second inductor.

9. A frequency converting apparatus comprising:

an analog multiplying circuit comprising a first differential pair constructed of a first transistor and a second transistor, the emitters of which are commonly connected to each other;

a second differential pair constructed of a third transistor and a fourth transistor, the emitters of which are commonly connected to each other;

a first input terminal connected to a commonly-connected base of said second transistor and said third transistor;

a second input terminal connected to a commonly-connected base of said first transistor and said fourth transistor;

a first output terminal connected to a commonly-connected collector of said first transistor and said third transistor;

a second output terminal connected to a commonly-connected collector of said second transistor and said fourth transistor;

a first resistor connected between said first output terminal and a power supply;

a second resistor connected between said second output terminal and said power supply;

a fifth transistor, the collector of which is connected to the commonly-connected emitter of said first differential pair;

a sixth transistor, the collector of which is connected to the commonly-connected emitter of said second differential pair;

a third resistor connected between an emitter of said fifth transistor and the ground;

a fourth resistor connected between an emitter of said sixth transistor and the ground;

first input means connected to a base of said fifth transistor; and second input means connected to a base of said sixth transistor; wherein:

said first input means is arranged by first current generating means, first current mirror means constituted by both said fifth transistor and a seventh transistor, a fifth resistor connected between an emitter of said seventh transistor and the ground, and a third input terminal connected to the emitter of said seventh transistor; and said second input means is arranged by second current generating means, a second current mirror means constituted by both said sixth transistor and an eighth transistor, a sixth resistor connected between an emitter of said eighth transistor and the ground; and a fourth input terminal connected to the emitter of said eighth transistor.

10. A frequency converting apparatus as claimed in claim 9, wherein:

said third resistor is replaced by a first inductor; and said fourth resistor is replaced by a second inductor.

11. A frequency converting apparatus as claimed in claim 10, wherein said analog multiplying circuit is further comprised of:

a seventh resistor connected between the emitter of said fifth transistor and the emitter of said sixth transistor;

a first capacitor connected parallel to said first inductor; and a second capacitor connected parallel to said second inductor.

12. A communication terminal apparatus comprising:

a frequency converting apparatus comprising an analog multiplying circuit comprising a first differential pair constructed of a first transistor and a second transistor, the emitters of which are commonly connected to each other;

a second differential pair constructed of a third transistor and a fourth transistor, the emitters of which are commonly connected to each other;

a first input terminal connected to a commonly-connected base of said second transistor and said third transistor;

a second input terminal connected to a commonly-connected base of said first transistor and said fourth transistor;

a first output terminal connected to a commonly-connected collector of said first transistor and said third transistor;

a second output terminal connected to a commonly-connected collector of said second transistor and said fourth transistor;

a first resistor connected between said first output terminal and a power supply;

a second resistor connected between said second output terminal and said power supply;

fifth transistor, the collector of which is connected to the commonly-connected emitter of said first differential pair;

a sixth transistor, the collector of which is connected to the commonly-connected emitter of said second differential pair;

a third resistor connected between an emitter of said fifth transistor and the ground;

a fourth resistor connected between an emitter of said sixth transistor and the ground;

first input means connected to a base of said fifth transistor; and second input means connected to a base of said sixth transistor; wherein:

said first input means is arranged by first current generating means, first current mirror means constituted by both said fifth transistor and a seventh transistor, a fifth resistor connected between an emitter of said seventh transistor and the ground, and a third input terminal connected to the emitter of said seventh transistor; and said second input means is arranged by second current generating means, a second current mirror means constituted by both said sixth transistor and an eighth transistor, a sixth resistor connected between an emitter of said eighth transistor and the ground; and a fourth input terminal connected to the emitter of said eighth transistor.

13. A communication terminal apparatus as claimed in claim 12, wherein said third resistor is replaced by a first inductor; and said fourth resistor is replaced by a second inductor.

14. A communication terminal apparatus as claimed in claim 12, wherein said variable gain amplifying circuit is further comprised of:

a seventh resistor connected between the emitter of said fifth transistor and the emitter of said sixth transistor;

a first capacitor connected parallel to said first inductor; and a second capacitor connected parallel to said second inductor.

15. A communication terminal apparatus comprising:

a variable gain amplifying circuit comprising a first differential pair constructed of a first transistor and a second transistor, the emitters of which are commonly connected to each other;

a second differential pair constructed of a third transistor and a fourth transistor, the emitters of which are commonly connected to each other;

a first input terminal connected to a commonly-connected base of said second transistor and said third transistor;

a second input terminal connected to a commonly-connected base of said first transistor and said fourth transistor;

a first output terminal connected to a collector of said first transistor;

a second output terminal connected to a collector of said fourth transistor;

a first resistor connected between said first output terminal and a power supply;

a second resistor connected between said second output terminal and said power supply;

variable gain control means constituted by said second transistor, and means for connecting the collector of said third transistor to the power supply;

a fifth transistor, the collector of which is connected to the commonly-connected emitter of said first differential pair;

a sixth transistor, the collector of which is connected to the commonly-connected emitter of said second differential pair;

a third resistor connected between an emitter of said fifth transistor and the ground;

a fourth resistor connected between an emitter of said sixth transistor and the ground;

first input means connected to a base of said fifth transistor; and second input means connected to a base of said sixth transistor; wherein:

said first input means is arranged by first current generating means, first current mirror means constituted by both said fifth transistor and a seventh transistor, a fifth resistor connected between an emitter of said seventh transistor and the ground, and a third input terminal connected to the emitter of said seventh transistor; and said second input means is arranged by second current generating means, second current mirror means constituted by both said sixth transistor and an eighth transistor, a sixth resistor connected between an emitter of said eighth transistor and the ground; and a fourth input terminal connected to the emitter of said eighth transistor.

16. A communication terminal apparatus as claimed in claim 15, wherein said third resistor is replaced by a first inductor; and said fourth resistor is replaced by a second inductor.

17. A communication terminal apparatus as claimed in claim 15, wherein said variable gain amplifying circuit is further comprised of:

a seventh resistor connected between the emitter of said fifth transistor and the emitter of said sixth transistor;

a first capacitor connected parallel to said first inductor; and a second capacitor connected parallel to said second inductor.

18. A base station apparatus comprising:

a frequency converting apparatus comprising an analog multiplying circuit comprising a first differential pair constructed of a first transistor and a second transistor, the emitters of which are commonly connected to each other;

a second differential pair constructed of a third transistor and a fourth transistor, the emitters of which are commonly connected to each other;

a first input terminal connected to a commonly-connected base of said second transistor and said third transistor;

a second input terminal connected to a commonly-connected base of said first transistor and said fourth transistor;

a first output terminal connected to a commonly-connected collector of said first transistor and said third transistor;

a second output terminal connected to a commonly-connected collector of said second transistor and said fourth transistor;

a first resistor connected between said first output terminal and a power supply;

a second resistor connected between said second output terminal and said power supply;

a fifth transistor, the collector of which is connected to the commonly-connected emitter of said first differential pair;

a sixth transistor, the collector of which is connected to the commonly-connected emitter of said second differential pair;

a third resistor connected between an emitter of said fifth transistor and the ground;

a fourth resistor connected between an emitter of said sixth transistor and the ground;

first input means connected to a base of said fifth transistor; and second input means connected to a base of said sixth transistor; wherein:

said first input means is arranged by first current generating means, first current mirror means constituted by both said fifth transistor and a seventh transistor, a fifth resistor connected between an emitter of said seventh transistor and the ground, and a third input terminal connected to the emitter of said seventh transistor; and said second input means is arranged by second current generating means, a second current mirror means constituted by both said sixth transistor and an eighth transistor, a sixth resistor connected between an emitter of said eighth transistor and the ground; and a fourth input terminal connected to the emitter of said eighth transistor.

19. A base station apparatus as claimed in claim 18, wherein said third resistor is replaced by a first inductor; and said fourth resistor is replaced by a second inductor.

20. A base station apparatus as claimed in claim 18, wherein said variable gain amplifying circuit is further comprised of:

a seventh resistor connected between the emitter of said fifth transistor and the emitter of said sixth transistor;

a first capacitor connected parallel to said first inductor; and a second capacitor connected parallel to said second inductor.

21. A base station apparatus comprising:

a variable gain amplifying circuit comprising a first differential pair constructed of a first transistor and a second transistor, the emitters of which are commonly connected to each other;

a second differential pair constructed of a third transistor and a fourth transistor, the emitters of which are commonly connected to each other;

a first input terminal connected to a commonly-connected base of said second transistor and said third transistor;

a second input terminal connected to a commonly-connected base of said first transistor and said fourth transistor;

a first output terminal connected to a collector of said first transistor;

a second output terminal connected to a collector of said fourth transistor;

a first resistor connected between said first output terminal and a power supply;

a second resistor connected between said second output terminal and said power supply;

variable gain control means constituted by said second transistor, and means for connecting the collector of said third transistor to the power supply;

a fifth transistor, the collector of which is connected to the commonly-connected emitter of said first differential pair;

a sixth transistor, the collector of which is connected to the commonly-connected emitter of said second differential pair;

a third resistor connected between an emitter of said fifth transistor and the ground;

a fourth resistor connected between an emitter of said sixth transistor and the ground;

first input means connected to a base of said fifth transistor; and second input means connected to a base of said sixth transistor; wherein:

said first input means is arranged by first current generating means, first current mirror means constituted by both said fifth transistor and a seventh transistor, a fifth resistor connected between an emitter of said seventh transistor and the ground, and a third input terminal connected to the emitter of said seventh transistor; and said second input means is arranged by second current generating means, second current mirror means constituted by both said sixth transistor and an eighth transistor, a sixth resistor connected between an emitter of said eighth transistor and the ground; and a fourth input terminal connected to the emitter of said eighth transistor.

22. A base station apparatus as claimed in claim 21, wherein said third resistor is replaced by a first inductor; and said fourth resistor is replaced by a second inductor.

23. A base station apparatus as in claim 21, wherein said variable gain amplifying circuit is further comprised of:

a seventh resistor connected between the emitter of said fifth transistor and the emitter of said sixth transistor;

a first capacitor connected parallel to said first inductor; and a second capacitor connected parallel to said second inductor.

* * * * *

UNITED STATES PATENT AND TRADEMARK OFFICE

CERTIFICATE OF CORRECTION

PATENT NO. : 6,437,631 B2 
DATED : August 20, 2002
INVENTOR(S) : Yasuhiro Amano

It is certified that error appears in the above-identified patent and that said Letters Patent is hereby corrected as shown below:

<u>Title page,</u>
Item [56], References Cited, FOREIGN PATENT DOCUMENTS, beginning "JP 2740440", please delete "*".
Beginning "JP 2861795", please delete "*".
Beginning "JP 11-251845", please delete "*".
OTHER PUBLICATIONS, beginning "Un Oscilloscope", please delete "*".

<u>Column 2,</u>
Line 20, after "2Vt", please insert -- } --.

<u>Column 4,</u>
Line 57, please delete "V1*p*and", and insert -- V1*p* and --.

<u>Column 7,</u>
Line 55, please delete "follows.", and insert therefor -- follows: --.

<u>Column 15,</u>
Line 20, before "fifth", please insert -- a --.

Signed and Sealed this

Seventeenth Day of December, 2002

JAMES E. ROGAN
*Director of the United States Patent and Trademark Office*